United States Patent
Yamada et al.

(10) Patent No.: US 11,705,576 B2
(45) Date of Patent: Jul. 18, 2023

(54) METHOD FOR PRODUCING SOLID ELECTROLYTE

(71) Applicant: IDEMITSU KOSAN CO., LTD., Tokyo (JP)

(72) Inventors: Hiroaki Yamada, Chiba (JP); Takeshi Makino, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 593 days.

(21) Appl. No.: 16/494,113

(22) PCT Filed: Mar. 12, 2018

(86) PCT No.: PCT/JP2018/009470
§ 371 (c)(1),
(2) Date: Sep. 13, 2019

(87) PCT Pub. No.: WO2018/168754
PCT Pub. Date: Sep. 20, 2018

(65) Prior Publication Data
US 2020/0373612 A1 Nov. 26, 2020

(30) Foreign Application Priority Data
Mar. 14, 2017 (JP) .................................. 2017-048933

(51) Int. Cl.
*H01M 4/02* (2006.01)
*H01M 10/0562* (2010.01)
*C03C 10/00* (2006.01)

(52) U.S. Cl.
CPC ......... *H01M 10/0562* (2013.01); *C03C 10/00* (2013.01); *C03C 2204/00* (2013.01); *H01M 2300/0068* (2013.01)

(58) Field of Classification Search
CPC ...................................................... H01M 4/02
See application file for complete search history.

(56) References Cited

U.S. PATENT DOCUMENTS

| | | |
|---|---|---|
| 8,962,194 B2 | 2/2015 | Senga et al. |
| 9,484,597 B2 | 11/2016 | Ohtomo et al. |
| 9,620,811 B2 | 4/2017 | Kambara et al. |
| 9,793,574 B2 | 10/2017 | Seino et al. |
| 9,806,373 B2 | 10/2017 | Kambara et al. |
| 9,859,562 B2 | 1/2018 | Koshika et al. |
| 10,116,002 B2 | 10/2018 | Sato et al. |
| 2007/0160911 A1 | 7/2007 | Senga et al. |
| 2014/0302382 A1 | 10/2014 | Kambara et al. |
| 2014/0343177 A1* | 11/2014 | Willis ................... B01D 71/80 521/27 |
| 2015/0162614 A1* | 6/2015 | Koshika ................ H01M 4/13 429/189 |
| 2016/0190638 A1* | 6/2016 | Sugiura ............ H01M 10/0562 429/189 |
| 2016/0240838 A1* | 8/2016 | Hayashi .............. H01M 4/0407 |
| 2017/0194662 A1 | 7/2017 | Kambara et al. |
| 2018/0155198 A1 | 6/2018 | Sato et al. |

FOREIGN PATENT DOCUMENTS

| | | |
|---|---|---|
| CN | 103650231 A | 3/2014 |
| EP | 3007181 A1 | 4/2016 |
| EP | 2779298 B1 | 4/2018 |
| EP | 2869371 B1 | 8/2018 |
| JP | 2005228570 A | 8/2005 |
| JP | 2013201110 A | 10/2013 |
| JP | 2014102987 A | 6/2014 |
| WO | 14174829 A1 | 10/2014 |
| WO | 2015050131 A1 | 4/2015 |
| WO | 2016204253 A1 | 12/2016 |

OTHER PUBLICATIONS

Search Report in corresponding EP Application No. 18767514.5, dated Nov. 26, 2020 (pp. 1-7).
Office Action in JP Application No. 2017-048933, dated Jun. 2, 2020 (pp. 1-2) and English translation (pp. 1-3).
International Search Report for PCT/JP2018/009470, Date of Completion of Search Report: Mar. 30, 2018, dated: Apr. 10, 2018.
Office Action in JP Application No. 201880018253.8, dated Oct. 21, 2020 (pp. 1-8) and english translation of same (p. 1-7).
Search Report in corresponding EP Application No. 18767514.5, dated Apr. 28, 2023 (pp. 1-5).

* cited by examiner

*Primary Examiner* — Jacob B Marks
(74) *Attorney, Agent, or Firm* — Millen, White, Zelano & Branigan, PC; Ryan Pool

(57) ABSTRACT

Disclosed is a method for producing a sulfide-based solid electrolyte containing an alkali metal, a sulfur element, a phosphorus element and a halogen element, including performing a reaction of an alkali metal sulfide and a substance containing at least one element of a sulfur element, a phosphorus element and a halogen element in an organic solvent having an electron-withdrawing group. The method provides a sulfide-based solid electrolyte having a high ion conductivity.

13 Claims, No Drawings

METHOD FOR PRODUCING SOLID ELECTROLYTE

TECHNICAL FIELD

The present invention relates to a method for producing a solid electrolyte.

BACKGROUND ART

In the field of all-solid batteries, heretofore, a sulfide-based solid electrolyte material has been known. For example, it is reported in PTL 1 that lithium sulfide and phosphorus sulfide are reacted to produce a sulfide glass and the sulfide glass is heat-treated to give a glass ceramic electrolyte having a high ion conductivity (for example, see PTL 1). In addition, it is also reported that a lithium halide, a lithium sulfide and a phosphorus sulfide are reacted to produce a sulfide glass and the sulfide glass is heat-treated to give a glass ceramic electrolyte having a high ion conductivity (for example, see PTL 2).

CITATION LIST

Patent Literature

PTL 1: JP 2005-228570 A
PTL 2: JP 2013-201110 A

SUMMARY OF INVENTION

Technical Problem

Recently, with rapid spread of information-related instruments and communication instruments and with advancement in performance thereof, sulfide-based solid electrolytes that are more inexpensive and have a higher ion conductivity have become desired. Generally, sulfide-based solid electrolytes are known to have different ion conductivities depending on the conditions for the production method thereof, for example, the kind and the blending ratio of raw materials to be used and the reaction condition such as reaction temperature. For satisfying the requirement for sulfide-based solid electrolytes that are more inexpensive and have a higher ion conductivity, investigations are desired from various angles in terms of production processes not limited to the methods described in PTLs 1 and 2.

The present invention has been made in consideration of the situation as above, and an object of the present invention is to provide a method for producing a sulfide-based solid electrolyte having a high ion conductivity.

Solution to Problem

The present inventors have assiduously studied for the purpose of solving the above-mentioned problems and, as a result, have found that the problems can be solved by the following invention.

[1] A method for producing a sulfide-based solid electrolyte containing an alkali metal, a sulfur element, a phosphorus element and a halogen element, including performing a reaction of an alkali metal sulfide and a substance containing at least one element of a sulfur element, a phosphorus element and a halogen element in an organic solvent having an electron-withdrawing group.

[2] The method for producing a sulfide-based solid electrolyte according to the above [1], wherein the substance contains an alkali metal halide.

[3] The method for producing a sulfide-based solid electrolyte according to the above [2], wherein the reaction is a reaction of an alkali metal sulfide, and a phosphorus compound and an alkali metal halide.

[4] The method for producing a sulfide-based solid electrolyte according to the above [2] or [3], wherein the alkali metal halide is at least one selected from lithium bromide and lithium iodide.

[5] The method for producing a sulfide-based solid electrolyte according to the above [3] or [4], wherein the phosphorus compound is phosphorus sulfide.

[6] The method for producing a sulfide-based solid electrolyte according to the above [1], wherein the substance contains a substance represented by a formula (1):

$$X_2 \tag{1}$$

wherein X represents a halogen element.

[7] The method for producing a sulfide-based solid electrolyte according to the above [6], wherein the substance represented by the formula (1) is at least one selected from iodine and bromine.

[8] The method for producing a sulfide-based solid electrolyte according to the above [6] or [7], wherein the reaction is a reaction of an alkali metal sulfide, and a phosphorus compound and the substance represented by the formula (1).

[9] The method for producing a sulfide-based solid electrolyte according to the above [8], wherein the phosphorus compound is phosphorus sulfide.

[10] The method for producing a sulfide-based solid electrolyte according to any one of the above [1] to [9], wherein the alkali metal sulfide is at least one selected from lithium sulfide and sodium sulfide.

[11] The method for producing a sulfide-based solid electrolyte according to any one of the above [1] to [10], wherein the organic solvent having an electron-withdrawing group is at least one selected from chlorobenzene, trifluoromethylbenzene and nitrobenzene.

[12] The method for producing a sulfide-based solid electrolyte according to the above [11], wherein the organic solvent having an electron-withdrawing group is chlorobenzene.

Advantageous Effects of Invention

According to the present invention, there can be provided a sulfide-based solid electrolyte having a high ion conductivity.

DESCRIPTION OF EMBODIMENTS

An embodiment of the present invention (which may be hereinafter referred to as "the present embodiment") is described below.

[Sulfide-Based Solid Electrolyte Production Method]

The sulfide-based solid electrolyte production method of the present invention produces a sulfide-based solid electrolyte containing an alkali metal element, a sulfur element, a phosphorus element and a halogen element, by performing a reaction of an alkali metal sulfide and a substance containing at least one element of a sulfur element, a phosphorus element and a halogen element (hereinafter this may be simply referred to as "a substance") in an organic solvent having an electron-withdrawing group.

The sulfide-based solid electrolyte is a solid electrolyte having sulfur as an indispensable component, and means an electrolyte that maintains a solid form at 25° C. in a nitrogen atmosphere. In the present embodiment, the sulfide-based solid electrolyte contains an alkali metal element, a sulfur element, a phosphorus element and a halogen element. The alkali metal element is preferably at least one selected from lithium and sodium, and the sulfide solid electrolyte to be obtained in the production method of the present embodiment has an ion conductivity attributable to an alkali metal element, preferably a lithium ion conductivity or a sodium ion conductivity.

The sulfide-based solid electrolyte includes both an amorphous sulfide-based solid electrolyte and a crystalline sulfide-based solid electrolyte having a crystal structure. These sulfide-based solid electrolytes will be described in detail hereinunder.

(Organic Solvent having Electron-Withdrawing Group)

The production method of the present embodiment needs to use an organic solvent having an electron-withdrawing group. Using an organic solvent having an electron-withdrawing group, the electrolyte produced can have a high ion conductivity.

Examples of the electron-withdrawing group include a halogen element, a halogen element-containing group such as a group containing a halogen atom (e.g., a group of an alkyl group, an alkoxy group or an aryl group in which a part or all of hydrogen atoms is/are substituted with a halogen atom), a nitrogen element-containing group such as a cyano group, a nitro group or an imide group, and an oxygen element-containing group such as a formyl group, an acyl group, a carboxy group an alkoxycarbonyl group or a sulfonyl group. Above all, a halogen element-containing group and a nitrogen element-containing group are preferred, a halogen element-containing group is more preferred, and a halogen element is even more preferred.

Typically, the organic solvent having an electron-withdrawing group includes a fluorine element-containing organic solvent such as trifluorobenzene, trifluoromethylbenzene, bromotrifluorobenzene, and perfluorohexane; a chlorine element-containing organic solvent such as chloroform, dichloromethane, dichloroethane, trichloroethane, tetrachloroethane, chlorobenzene, chlorotoluene, and chlorophenol; a bromine element-containing organic solvent such as bromobenzene, bromoform, and dibromoethane; a nitrogen element-containing organic solvent such as nitrobenzene, and acetonitrile; and an oxygen element-containing organic solvent such as formaldehyde, acetaldehyde, dimethylformamide, acetone, methyl ethyl ketone, ethyl acetate, butyl acetate, and dimethyl sulfoxide.

Among these, from the viewpoint of providing a high ion conductivity, a fluorine element-containing organic solvent, a chlorine element-containing organic solvent and a nitrogen-containing organic solvent are preferred, and more specifically, an organic solvent having a benzene ring such as trifluorobenzene, chlorobenzene, chlorotoluene, and nitrobenzene is more preferred, and chlorobenzene is especially preferred.

In the present embodiment, any other organic solvent than an organic solvent having an electron-withdrawing group may be used additionally. Example of the other organic solvent includes an aliphatic hydrocarbon solvent such as hexane, pentane, 2-ethylhexane, heptane, octane, decane, undecane, dodecane, and tridecene; an alicyclic hydrocarbon solvent such as cyclohexane, and methylcyclohexane; an aromatic hydrocarbon solvent such as benzene, toluene, xylene, and mesitylene; and a solvent containing a carbon atom and a hetero atom such as carbon disulfide, diethyl ether, dibutyl ether, and tetrahydrofuran.

The content of the organic solvent having an electron-withdrawing group in the organic solvent for use in the present embodiment is preferably higher, from the viewpoint of providing a higher ion conductivity, and is preferably 50% by mass or more, more preferably 75% by mass or more, even more preferably 90% by mass or more, still more preferably 95% by mass or more, and is preferably 100% by mass, that is, preferably, an organic solvent having an electron-withdrawing group alone is used.

The amount to be used of the organic solvent having an electron-withdrawing group is preferably such that the total amount to be used of the alkali metal sulfide and the substance containing at least one element of a sulfur element, a phosphorus element and a halogen element in one liter of the solvent can be 0.1 to 1 kg, more preferably 0.05 to 0.8 kg, even more preferably 0.2 to 0.7 kg. When the amount to be used of the organic solvent having an electron-withdrawing group falls within the above range, the resultant is slurry, and the alkali sulfide and the substance to be reacted therewith can be more smoothly reacted therein, and in addition, in the case where the solvent needs to be removed, the solvent can be readily removed.

(Alkali Metal Sulfide)

Preferred examples of the alkali metal sulfide for use in the present embodiment include lithium sulfide ($Li_2S$), sodium sulfide ($Na_2S$), potassium sulfide ($K_2S$), rubidium sulfide ($Rb_2S$), and cesium sulfide ($Cs_2S$). Considering that use of an alkali metal having a smaller molecular weight tends to increase the ion conductivity of the sulfide-based solid electrolyte to be produced, lithium sulfide ($Li_2S$), and sodium ($Na_2S$) are more preferred, and lithium sulfide ($Li_2S$) is even more preferred.

One of these alkali metal sulfides may be used singly or plural kinds thereof may be used in combination. From the viewpoint of increasing the ion conductivity, in the case where plural kinds are combined, a combination of lithium sulfide and ($Li_2S$) sodium sulfide ($Na_2S$) is preferred. Considering that use of a light alkali metal tends to increase the ion conductivity of the sulfide-based solid electrolyte to be produced, use of lithium sulfide ($Li_2S$) alone is especially preferred.

The alkali metal sulfide for use in the present embodiment is preferably in the form of granules.

Here, the average particle size ($D_{50}$) of the alkali metal sulfide granules is preferably 10 μm or more and 2,000 μm or less, more preferably 30 μm or more and 1500 μm or less, even more preferably 50 μm or more and 1,000 μm or less. In the present description, the average particle size ($D_{50}$) is a particle size to reach 50% of all the particles in sequential cumulation from the smallest particles in drawing the particle size distribution cumulative curve, and for example, the average particle size can be measured using a laser diffraction/scattering particle size distribution measuring apparatus.

Preferably, the alkali metal sulfide does not contain water, and the content of water that may be contained as an impurity is preferably 100 ppm by mass or less, more preferably 80 ppm by mass or less, even more preferably 50 ppm by mass or less, further more preferably 30 ppm by mass or less, and especially more preferably 20 ppm by mass or less. Having such a water content, the performance of the sulfide-based solid electrolyte to be produced would not worsen.

(Substance Containing at Least One Element of Sulfur Element, Phosphorus Element and Halogen Element)

In the present embodiment, the substance containing at least one element of a sulfur element, a phosphorus element and a halogen element to be reacted with the alkali metal sulfide is not specifically limited so far as the substance contains at least one of these elements, and examples thereof include an alkali metal halide and a phosphorus compound.

(Alkali Metal Halide)

Examples of the alkali metal halide include an alkali metal halide, such as a sodium halide such as sodium iodide, sodium fluoride, sodium chloride and sodium bromide; and a lithium halide such as lithium fluoride, lithium chloride, lithium bromide and lithium iodide. Above all, a lithium halide is preferred, and lithium bromide and lithium iodide are more preferred. One of these alkali metal halides may be used singly or plural kinds thereof may be used in combination. In the present embodiment, especially preferably, lithium bromide and lithium iodide are used in combination.

(Phosphorus Compound)

Preferred examples of the phosphorus compound include phosphorus sulfide such as diphosphorus trisulfide ($P_2S_3$), and diphosphorus pentasulfide ($P_2S_5$); and phosphate compounds such as sodium phosphate ($Na_3PO_4$), and lithium phosphate ($Li_3PO_4$). Above all, phosphorus sulfide is preferred, and diphosphorus pentasulfide ($P_2S_5$) is more preferred. The phosphorus compound may include an elemental phosphorus. Phosphorus compounds such as diphosphorus pentasulfide ($P_2S_5$) that are industrially produced and sold commercially are readily available. One of these phosphorus compounds may be used singly or plural kinds thereof may be used in combination.

In the case where a alkali metal halide is used as the substance to be reacted with an alkali metal sulfide, from the viewpoint of attaining a higher ion conductivity, preferably an alkali metal sulfide, and a phosphorus compound and an alkali metal halide are reacted, more preferably lithium sulfide, and phosphorus sulfide and at least one selected from lithium bromide and lithium iodide are reacted, and even more preferably lithium sulfide, and diphosphorus pentasulfide, lithium bromide and lithium iodide are reacted.

(Other Substance)

In the present embodiment, any other substance than the above-mentioned alkali metal halide and phosphorus compound may be used.

For example, a lithium compound such as lithium oxide ($Li_2O$) or lithium carbonate ($Li_2CO_3$) may be used to supply the alkali metal element (lithium (Li)).

Using a metal sulfide such as silicon sulfide ($SiS_2$), germanium sulfide ($GeS_2$), boron sulfide ($B_2S_3$), gallium sulfide ($Ga_2S_3$), tin sulfide (SnS or $SnS_2$), aluminum sulfide ($Al_2S_3$), or zinc sulfide (ZnS), a sulfur element may be supplied.

Using a phosphorus halide such as various phosphorus fluorides ($PF_3$, $PF_5$), various phosphorus chlorides ($PC_3$, $PCl_5$, $P_2Cl_4$), phosphorus oxybromide ($POCl_3$), various phosphorus bromides ($PBr_3$, $PBr_5$), phosphorus oxybromide ($POBr_3$), or various phosphorus iodides ($PI_3$, $P_2I_4$), a phosphorus element and a halogen element may be supplied at the same time. Using a thiophosphoryl halide such as thiophosphoryl fluoride ($PSF_3$), thiophosphoryl chloride ($PSCl_3$), thiophosphoryl bromide ($PSBr_3$), thiophosphoryl iodide (PSIS), thiophosphoryl dichlorofluoride ($PSCl_2S$), or thiophosphoryl dibromofluoride ($PSBr_2F$), a phosphorus element, a sulfur element and a halogen element may be supplied at the same time.

Using a metal halide such as an aluminum halide, a silicon halide, a germanium halide, an arsenic halide, a selenium halide, a tin halide, an antimony halide, a tellurium halide, or a bismuth halide, a halogen element may be supplied.

(Blending Ratio)

In the case where an alkali halide is used as the substance to be reacted with an alkali metal sulfide and where lithium sulfide is used as an alkali metal sulfide and diphosphorus pentasulfide is used as a phosphorus compound, the proportion of lithium sulfide to the total of lithium sulfide and diphosphorus pentasulfide is, from the viewpoint of realizing higher chemical stability and higher ion conductivity, preferably 70 to 80 mol %, more preferably 72 to 78 mol %, even more preferably 74 to 76 mol %.

In the case where lithium sulfide, diphosphorus pentasulfide, an alkali metal halide and optionally any other substance are used, the content of lithium sulfide and diphosphorus pentasulfide relative to the total of all these substances is preferably 60 to 100 mol %, more preferably 65 to 90 mol %, even more preferably 70 to 80 mol %.

In the case where lithium bromide and lithium iodide are used in combination as a lithium halide, the proportion of lithium bromide to the total of lithium bromide and lithium iodide is, from the viewpoint of increasing ion conductivity, preferably 1 to 99 mol %, more preferably 20 to 90 mol %, even more preferably 40 to 80 mol %, and especially more preferably 50 to 70 mol %.

(Substance $X_2$)

In the present embodiment, preferably, a substance represented by the formula (1) (hereinafter this may be referred to as "substance $X_2$") is used as the substance to be reacted with an alkali metal sulfide. Using the substance $X_2$, an especially high ion conductivity can be realized owing to the synergistic effect of using an organic solvent having an electron-drawing group.

$$X_2 \qquad (1)$$

In the general formula (1), X represents a halogen element.

The substance $X_2$ includes fluorine ($F_2$), chlorine ($Cl_2$), bromine ($Br_2$), and iodine ($I_2$), and above all, chlorine ($Cl_2$), bromine ($Br_2$), and iodine ($I_2$) are preferred, and one of them may be used singly or plural kinds thereof may be used in combination. From the viewpoint of realizing a higher ion conductivity, bromine ($Br_2$), and iodine ($I_2$) are more preferred as the substance $X_2$.

In the case where the substance $X_2$ is used as the substance to be reacted with an alkali metal sulfide, preferably, an alkali metal halide is not used. Using the substance $X_2$ as a supply source for a halogen element provides a further higher ion conductivity. In addition, since an alkali metal halide, especially lithium bromide (LiBr) or lithium iodide (LH) is produced by reaction in water, removal of water is needed prior to reaction with an alkali metal sulfide. When an alkali metal halide is not used, a step of removing water can be omitted, and therefore, while the production process including a step of producing a substance to be reacted with an alkali metal sulfide is simplified and while the production cost is reduced, a sulfide-based solid electrolyte having a high ion conductivity can be supplied.

Preferably, the amount of water as an impurity in the substance $X_2$ is small.

In the case where the substance $X_2$ is used as the substance to be reacted with an alkali metal sulfide, preferably, an alkali metal sulfide, and a phosphorus compound and the substance $X_2$ are reacted from the viewpoint of realizing a higher ion conductivity, more preferably, lithium bromide, and phosphorus sulfide and at least one selected from bromine and iodine are reacted, and even more preferably lithium sulfide, and phosphorus sulfide, bromine and iodine are reacted. Also in the case of using the substance $X_2$, any other substance mentioned above may be used.

(Blending Ratio)

In the case where the substance $X_2$ is used as the substance to be reacted with an alkali metal sulfide and where lithium sulfide is used as an alkali metal sulfide and diphosphorus pentasulfide is used as a phosphorus compound, the proportion of the molar number of lithium sulfide excluding the same molar number of lithium sulfide as the molar number of the substance $X_2$, relative to the total molar number of lithium sulfide excluding the same molar number of lithium sulfide as the molar number of the substance $X_2$ and diphosphorus pentasulfide preferably falls within a range of 60 to 90%, more preferably within a range of 65 to 85%, even more preferably within a range of 68 to 82%, further more preferably within a range of 72 to 78%, and especially more preferably within a range of 73 to 77%. This is because, in such a proportion, a sulfide-based solid electrolyte having a high ion conductivity can be obtained.

In the case where a phosphorus compound and the substance $X_2$ are used as the substances to be reacted with an alkali metal sulfide, the content of the substance $X_2$ relative to the total amount of the alkali metal sulfide, the phosphorus compound and the substance $X_2$ is preferably 1 to 50 mol %, more preferably 2 to 40 mol %, even more preferably 3 to 25 mol %, and further more preferably 3 to 15 mol %.

In the case where a phosphorus compound, the substance $X_2$ and a lithium halide are used as the substances to be reacted with an alkali metal sulfide, the content ($\alpha$ mol %) of the substance $X_2$ and the content ($\beta$ mol %) of the lithium halide relative to the total amount of these substances preferably satisfies the following expression (2), more preferably satisfies the following expression (3), even more preferably satisfies the following expression (4), and further more preferably satisfies the following expression (5).

$$2 \leq 2\alpha + \beta \leq 100 \quad (2)$$

$$4 \leq 2\alpha + \beta \leq 80 \quad (3)$$

$$6 \leq 2\alpha + \beta \leq 50 \quad (4)$$

$$6 \leq 2\alpha + \beta \leq 30 \quad (5)$$

In the case where the substance $X_2$ is used as the substance to be reacted with an alkali metal sulfide, where two kinds of elements are contained as the halogen elements, and where the molar number of one halogen element in the substances is referred to as A1 and the molar number of the other halogen element in the substances is referred to as A2, A1/A2 is preferably 1/99 to 99/1, more preferably 10/90 to 90/10, even more preferably 20/80 to 80/20, and further more preferably 30/70 to 70/30.

In the case where the substance X2 is used as the substance to be reacted with an alkali sulfide, where a bromine element and an iodine element are contained as the halogen elements, and where the molar number of the bromine element in the substances is referred to as B1 and the molar number of the iodine element in the substances is referred to as B2, B1/B2 is preferably 1/99 to 99/1, more preferably 15/85 to 90/10, even more preferably 20/80 to 80/20, further more preferably 30/70 to 75/25, and especially more preferably 35/65 to 75/25.

In the production method of the present embodiment, a solid electrolyte containing an alkali metal element, a phosphorus element and a sulfur element can be used as the substance to be reacted with an alkali metal sulfide. Examples of such a solid electrolyte include $Li_2S-P_2S_5$, $Li_2S-P_2S_5-LiI$, $Li_2S-P_2S_5-LiCl$, $Li_2S-P_2S_5-LiBr$, $Li_2S-P_2S_5-Li_2O$, $Li_2S-P_2S_5-Li_2O-LiI$, $Li_2S-SiS_2-P_2S_5-LiI$, and $Li_2S-P_2S_5-Z_mS_n$ (where m and n each are a positive number; Z is any of Si, Ge, Zn, Ga, Sn, and Al). As known from these exemplifications, a solid electrolyte containing an oxygen element and any other element may be used as the substance to be reacted with an alkali metal sulfide so far as such a solid electrolyte contains a phosphorus element, a sulfur element and a halogen element.

For example, in the case where $Li_2S-P_2S_5$ is used as a raw material, the substance $X_2$, for example, at least one of iodine ($I_2$), and bromine ($Br_2$) can be supplied. In this case, iodine ($I_2$) alone can be supplied as the substance $X_2$, and lithium bromide (LiBr) can be used as the supply source for a bromine element, or a raw material containing any other halogen element can be used, and in accordance with the solid electrolyte to be used as the substance to be reacted with an alkali metal sulfide or with a desired sulfide-based solid electrolyte, any one can be appropriately selected and used from those exemplified hereinabove as the substance to be reacted with an alkali metal sulfide.

Among the above, for example, in the case where a solid electrolyte not containing a halogen element such as $Li_2S-P_2S_5-Li_2O$, or $Li_2S-P_2S_5-Z_mS_n$ is used as a raw material, a halogen element-containing sulfide-based solid electrolyte can also be produced like in the case of $Li_2S-P_2S_5$.

Also for example, in the case where $Li_2S-P_2S_5-LiBr$ is used as a raw material, an iodine element-containing solid electrolyte can be produced by using iodine ($I_2$) as the substance $X_2$.

(Mixing, Stirring and Grinding)

When the raw materials of an alkali metal sulfide and other substances are reacted in the production method for a sulfide-based solid electrolyte of the present embodiment, for example, these raw materials may be mixed, stirred or ground or may be processed through any of these treatments as combined, for the purpose of increasing the reaction speed to thereby efficiently produce a sulfide-based solid electrolyte.

The mixing method is not specifically limited. For example, raw materials and optionally a solvent may be put into a production device where a solvent, an alkali metal sulfide and other substances can be mixed, and mixed therein. The production device is not specifically limited so far as an alkali metal sulfide, other substances and a solvent can be mixed therein, and for example, a medium-assisted grinding machine may be used.

The medium-assisted grinding machine may be roughly grouped into a container-driven grinding machine and a medium-stirring grinding machine. The container-driven grinding machine includes a stirring tank, a grinding tank, and a ball mill and a bead mill including these as combined. The medium-stirring grinding machine includes various types of grinding machines of an impact grinding machine such as as a cutter mill, a hammer mill and a pin mill; a tower-type grinding machine such as a tower mill; a stirring tank grinding machine such as an attritor, an aquamizer, and a sand grinder; a fluid tank grinding machine such as a viscomill, and a pear mill; a fluid tube grinding machine; an annular type grinding machine such as a co-ball mill; a continuous dynamic grinding machine; and a monoaxial or multiaxial kneading machine.

These grinding machines may be appropriately selected depending on the intended size thereof, and for a relatively small-size system, a container-driven grinding machine such as a ball mill or a bead mill may be used, while for large-scale or industrial-scale mass production, the other types of grinding machines are preferably used.

When these grinding machines are used, an alkali metal sulfide, other substances and a solvent, and also grinding media are put thereinto, and then the machine is driven to attain mixing, stirring and grinding therein. Here, an alkali metal sulfide, other substances, a solvent and grinding media are put into the machine, but the order of putting them thereinto is not limited.

In the production method for a sulfide-based solid electrolyte of the present embodiment, an alkali metal sulfide, other substances and a solvent are mixed, and therefore alkali metal sulfide and the other substances can be brought into contact more readily to promote the reaction therebetween to give a sulfide-based solid electrolyte. From the viewpoint of promoting the contact between an alkali metal sulfide and other substances to give efficiently a sulfide-based solid electrolyte, it is desirable that an alkali metal sulfide, other substances and a solvent are mixed, and further stirred and ground, or processed for treatment of stirring and grinding. From the viewpoint of promoting the contact between an alkali metal sulfide and other substances, in particular, a treatment including grinding, namely a treatment of grinding, or stirring and grinding is preferably carried out. In the treatment of grinding, the surfaces of an alkali metal sulfide and other substances may be cut off to make new surfaces thereof exposed out, and as a result, the new surfaces may be brought into contact with the surfaces of other alkali metal sulfide and substances to further promote the reaction between the alkali metal sulfide and the other substances to efficiently produce a sulfide-based solid electrolyte.

For example, a device of a ball mill or a bead mill is described as an example. In these mills, the grain size of the media therein such as balls or beads (balls generally have a size of ϕ2 to 20 mm or so, and beads generally have a size of 00.02 to 2 mm or so, the material thereof (for example, metals such as stainless, chrome steel, or tungsten carbide; ceramics such as zirconia or silicon nitride; minerals such as agate), the rotation number of the rotor and the time may be selected to attain mixing, stirring or grinding, or a combined treatment thereof, and the particle size of the resultant sulfide-based solid electrolyte can be controlled.

In the present embodiment, these conditions are not specifically limited. For example, using a ball mill, especially a planetary ball mill, and using balls of ceramics, above all zirconia balls having a size of ϕ1 to 10 mm, raw materials may be stirred and ground at a rotor rotation number of 300 to 1,000 rpm for 0.5 to 100 hours.

The temperature in mixing, stirring and grinding is not specifically limited, and may be, for example, 20 to 80° C.

In the present embodiment, after an alkali metal sulfide, other substances and a solvent have been mixed, an alkali metal sulfide and other substances may be further added thereto and mixed, and this operation may be repeated twice or more.

In the case where an alkali metal sulfide, other substances and a solvent are mixed and stirred, an alkali metal sulfide and other substances may be further added and mixed or mixed and stirred during mixing and stirring them and/or after that, and this operation may be repeated twice or more. For example, an alkali metal sulfide, other substances and a solvent are put into a ball mill or a bead mill, and mixed and stirred therein, and during the mixing and stirring, additional raw materials may be further put into the container, and after mixing and stirring them (after the mixing and stirring is once stopped), raw materials may be put into the container, and mixing and stirring them may be restarted, or during mixing and stirring, and after that, additional raw materials may be put into the container.

Also in the case where an alkali metal sulfide, other substances and a solvent are mixed and ground, or stirred and ground, an alkali metal sulfide and other substances may be further added like in the above-mentioned case of stirring.

In that manner, by further adding an alkali metal sulfide and other substances, the frequency of optional treatment of solvent removal or the like may be reduced, and accordingly, a sulfide-based solid electrolyte can be produced more efficiently.

In the case where an alkali metal sulfide and other substances are further added, if desired, a solvent may also be added, but the solvent will have to be removed in obtaining the intended sulfide-based solid electrolyte, the amount of the solvent to be additionally added is preferably minimized.

(Removal of Solvent)

The sulfide-based solid electrolyte thus obtained in the manner as above contains a solvent. Accordingly, in the production method of the present embodiment, preferably, the solvent is removed. By removing the solvent, the side product sulfur may also be removed.

The solvent removal may be carried out according to a method where the solvent-containing sulfide-based solid electrolyte is once transferred to a container, and after the solid electrolyte has deposited therein, the supernatant solvent is removed.

The solvent may be removed by drying, which may be combined with removal of the supernatant solvent. In this case, for example, the precipitated solid electrolyte is put on a heating device such as a hot plate, and then heated thereon at 50 to 90° C. to vaporize the solvent for solvent removal.

Depending on the solvent, reduced-pressure drying may be carried out using a vacuum pump or the like at a temperature of 90 to 110° C. or so. For example, this is effective for the case where an aromatic hydrocarbon solvent such as xylene, ethylbenzene or chlorobenzene is used.

(Heating)

The production method of the present embodiment may further include heating. An amorphous sulfide-based solid electrolyte can be obtained according to the above-mentioned production method, but by further heating, the amorphous solid electrolyte may be converted into a crystalline sulfide-based solid electrolyte. The amorphous and crystalline sulfide-based solid electrolytes will be described hereinunder.

The heating temperature may be appropriately selected depending on the structure of the amorphous solid electrolyte, and for example, when the temperature at the peak top of the endothermic peak observed on the lowest temperature side in differential thermal analysis of the amorphous solid electrolyte under a heating rate of 10° C./min by means of a differential thermal analysis apparatus (DTA apparatus) is taken as a starting point, the heating temperature is preferably in a range of the temperature of the starting point ±40° C., more preferably the temperature of the starting point ±30° C., even more preferably the temperature of the starting point ±20° C.

More specifically, the heating temperature is preferably 150° C. or higher, more preferably 170° C. or higher, even more preferably 190° C. or higher. On the other hand, the upper limit of the heating temperature is not specifically limited, and is preferably 300° C. or lower, more preferably 280° C. or lower, even more preferably 250° C. or lower.

The heating time is not specifically limited so far as a desired crystalline sulfide-based solid electrolyte can be produced within the time, and is, for example, preferably 1 minute or more, more preferably 10 minutes or more, even more preferably 30 minutes or more, and the upper limit of the heating time is not specifically limited, and is preferably 24 hours or less, more preferably 10 hours or less, even more preferably 5 hours or less.

Preferably, the heating is carried out in an inert gas atmosphere (for example, nitrogen atmosphere, argon atmosphere), or a reduced-pressure atmosphere (especially in vacuum). This is because the crystalline solid electrolyte can be prevented from being degraded (for example, oxidized). The heating method is not specifically limited, and for example, a method of using a vacuum heating apparatus, an argon gas atmosphere furnace or a baking furnace may be employed. Industrially, a horizontal drying machine, a horizontal shaking flow drying machine or the like having a heating means and a feeding mechanism may also be employed.

(Sulfide-Based Solid Electrolyte)

The sulfide-based solid electrolyte obtained according to the production method of the present embodiment is a solid electrolyte containing an alkali metal element, a sulfur element, a phosphorus element and a halogen element, and has an extremely high ion conductivity of, for example, $5.2 \times 10^{-3}$ (S/cm) or more, $5.3 \times 10^{-3}$ (S/cm) or more, $5.5 \times 10^{-3}$ (S/cm) or more, or $5.7 \times 10^{-3}$ (S/cm) or more.

The sulfide-based solid electrolyte obtained according to the production method of the present embodiment may be amorphous or crystalline. In this description, an amorphous sulfide-based solid electrolyte means that the X-ray diffraction pattern thereof in X-ray diffractometry is a halo pattern not substantially showing any other peak than materials-derived peaks, irrespective of the presence or absence of peaks derived from the raw materials of the solid electrolyte.

The amorphous sulfide-based solid electrolyte has a high ion conductivity and can increase battery output.

The amorphous sulfide-based solid electrolyte obtained according to the production method of the present embodiment contains an alkali metal element, a sulfur element, a phosphorus element and a halogen element, and typically, preferred examples thereof include a sulfide-based solid electrolyte composed of lithium sulfide, phosphorus sulfide and an alkali metal halide such as $Li_2S$—$P_2S_5$—$LiI$, $Li_2S$—$P_2S_5$—$LiCl$, $Li_2S$—$P_2S_5$—$LiBr$, and $Li_2S$—$P_2S_5$—$LiI$—$LiBr$; and a sulfide-based solid electrolyte further containing any other element such as an oxygen element and a silicon element, such as $Li_2S$—$P_2S_5$—$Li_2O$—$LiI$, and $Li_2S$—$SiS_2$—$P_2S_5$—$LiI$. From the viewpoint of providing a higher ion conductivity, a sulfide-based solid electrolyte composed of lithium sulfide, phosphorus sulfide and an alkali metal halide, such as $Li2S$—$P_2S_5$—$LiI$, $Li_2S$—$P_2S_5$—$LiCl$, $Li_2S$—$P_2S_5$—$LiBr$, and $Li_2S$—$P_2S_5$—$LiI$—$LiBr$ is preferred.

The kind of the element constituting the amorphous sulfide-based solid electrolyte can be identified, for example, using an ICP emission spectrometric apparatus.

In the case where the sulfide-based solid electrolyte obtained according to the production method of the present embodiment has at least $Li_2S$—$P_2S_5$, the molar ratio of $Li_2S$ to $P_2S_5$ is, from the viewpoint of providing a higher ion conductivity, preferably (65 to 85)/(15 to 35), more preferably (70 to 80)/(20 to 30), even more preferably (72 to 78)/(22 to 28).

In the case where the sulfide-based solid electrolyte obtained according to the production method of the present embodiment is, for example, $Li_2S$—$P_2S_5$—$LiI$—$LiBr$, the total content of lithium sulfide ($Li_2S$) and diphosphorus pentasulfide ($P_2S_5$) is preferably 60 to 100 mol %, more preferably 65 to 90 mol %, even more preferably 70 to 85 mol %. The ratio of lithium bromide (LiBr) to the total of lithium bromide (LiBr) and lithium iodide (LiI) is preferably 1 to 99 mol %, more preferably 20 to 90 mol %, even more preferably 40 to 80 mol %, and especially preferably 50 to 70 mol %.

In the case where the sulfide-based solid electrolyte obtained according to the production method of the present embodiment contains an alkali metal element, a sulfur element, a phosphorus element and a halogen element, the blending ratio(by mol) of these elements is preferably 1.0 to 1.8:1.0 to 2.0:0.1 to 0.8:0.01 to 0.6, more preferably 1.1 to 1.7:1.2 to 1.8:0.2 to 0.6:0.05 to 0.5, and even more preferably 1.2 to 1.6:1.3 to 1.7:0.25 to 0.5:0.08 to 0.4. In the case where bromine and iodine are used together as the halogen elements, the blending ratio (by mol) of the alkali metal element, the sulfur element, the phosphorus element, bromine and iodine is preferably 1.0 to 1.8:1.0 to 2.0:0.1 to 0.8:0.01 to 0.3:0.01 to 0.3, more preferably 1.1 to 1.7:1.2 to 1.8:0.2 to 0.6:0.05 to 0.25:0.05 to 0.25, even more preferably 1.2 to 1.6:1.3 to 1.7:0.25 to 0.5:0.07 to 0.2:0.07 to 0.2, and still more preferably 1.35 to 1.45:1.4 to 1.7:0.3 to 0.45:0.08 to 0.18:0.08 to 0.18. When the blending ratio (by mol) of the lithium element, the sulfur element, the phosphorus element and the halogen element falls within the above range, a solid electrolyte having a higher lithium ion conductivity can be obtained.

The shape of the amorphous sulfide-based solid electrolyte is not specifically limited, and is, for example, granular. The mean particle size ($D_{50}$) of the granular amorphous sulfide-based solid electrolyte is, for example, within a range of 0.01 μm to 500 μm, or 0.1 to 200 μm.

The sulfide-based solid electrolyte obtained according to the production method of the present invention may be crystalline. In this description, a crystalline sulfide-based solid electrolyte is a sulfide-based solid electrolyte whose X-ray diffraction pattern in X-ray diffractometry shows peaks derived from the sulfide-based solid electrolyte, irrespective of the presence or absence of peaks derived from the raw materials for the sulfide-based solid electrolyte therein. Specifically, the crystalline sulfide-based solid electrolyte contains a crystal structure derived from the sulfide-based solid electrolyte, and a part thereof may be a crystal structure derived from the sulfide-based solid electrolyte or all thereof may be a crystal structure derived from the sulfide-based solid electrolyte. With that, the crystalline sulfide-based solid electrolyte may contain, as a part thereof, an amorphous sulfide-based solid electrolyte so far as it has the X-ray diffraction pattern as mentioned above.

More specifically, examples of the crystal structure of the crystalline sulfide-based solid electrolyte include an $Li_3PS_4$ crystal structure, an $Li_4P_2S_6$ crystal structure, an $Li_7PS_6$ crystal structure, an $Li_7P_3S_{11}$ crystal structure, and a crystal structure having peaks at around $2\theta=20.2°$ and $23.6°$ (for example, JP-2013-16423A).

In addition, there are further mentioned an $Li_{4-x}Ge_{1-x}P_xS_4$-based thio-LISICON Region II-type crystal structure (see Kanno, et al., Journal of The Electrochemical Society, 148 (7) A742-746 (2001)), and a crystal structure similar to the $Li_{4-x}Ge_{1-x}P_xS_4$-based thio-LISICON Region II-type crystal structure (see Solid State Ionics, 177 (2006), 2721-2725).

In X-ray diffractometry thereof a CuKα ray, the $Li_3PS_4$ crystal structure gives diffraction peaks, for example, at around 2θ=17.5°, 18.3°, 26.1°, 27.3°, 30.0°; the $Li_4P_2S_6$ crystal structure gives diffraction peaks, for example, at around 2θ=16.9°, 27.1°, 32.5°; the $Li_7PS_6$ crystal structure gives diffraction peaks, for example, at around 2θ=15.3°, 25.2°, 29.6°, 31.0°; the $Li_7P_3SH$ crystal structure gives diffraction peaks, for example, at around 2θ=17.8°, 18.5°, 19.7°, 21.8°, 23.7°, 25.9°, 29.6°, 30.0°; the $Li_{4-x}Ge_{1-x}P_xS_4$-based thio-LISICON Region II-type crystal structure gives diffraction peaks, for example, at around 2θ=20.1°, 23.9°, 29.5°; and the crystal structure similar to the $Li_{4-x}Ge_{1-x}P_xS_4$-based thio-LISICON Region II-type crystal structure gives diffraction peaks, for example, at around 2θ=20.2, 23.6°. The position of these peaks may vary within a range of ±0.5°.

The crystal structure of the crystalline sulfide-based solid electrolyte also includes an argyrodite-type crystal structure. Examples of the argyrodite-type crystal structure include an $Li_7PS_6$ crystal structure; a crystal structure represented by a compositional formula $Li_{7-x}P_{1-y}Si_yS_6$ or $Li_{7+x}P_{1-y}Si_yS6$ (x is −0.6 to 0.6, y is 0.1 to 0.6) which has a structure of $Li_7PS_6$ and in which a part of P is substituted with Si; a crystal structure represented by $Li_{7-x-2y}PS_{6-x-y}Cl_x$ (0.8≤x≤1.7, 0<y≤−0.25x+0.5); a crystal structure represented by $Li_{7-x}PS_{6-x}Ha_x$ (Ha represents Cl or Br, x is preferably 0.2 to 1.8).

The crystal structure represented by a compositional formula $Li_{7-x}P_{1-y}Si_yS_6$ or $Li_{7+x}P_{1-y}Si_yS_6$(x is −0.6 to 0.6, y is 0.1 to 0.6), which has the above-mentioned structure skeleton of $Li_7PS_6$ and in which a part of P is substituted with Si, is a cubic crystal or a rhombic crystal, and is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°. The crystal structure represented by the above-mentioned compositional formula $Li_{7-x-2y}PS_{6-x-y}Cl_x$ (0.8≤x≤1.7, 0<y≤−0.25x+0.5) is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°. The crystal structure represented by the compositional formula $Li_{7-x}PS_{6-x}Ha_x$ (Ha represents Cl or Br, x is preferably 0.2 to 1.8) is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°.

These peak positions may vary within a range of ±0.5°.

The shape of the crystalline sulfide-based solid electrolyte is not specifically limited, and is, for example, granular. The mean particle size ($D_{50}$) of the granular crystalline sulfide-based solid electrolyte is, for example, within a range of 0.01 μm to 500 μm, or 0.1 to 200 μm.

The sulfide-based solid electrolyte obtained according to the production method of the present embodiment has a high ion conductivity and has excellent battery performance, and is therefore favorably used for batteries. Use of a lithium element as the conductor species is especially preferred. The sulfide-based solid electrolyte of the present embodiment may be used as a positive electrode layer or a negative electrode layer, or may also be used as an electrolyte layer. Each layer may be produced according to a known method.

Preferably, the battery has a collector in addition to the positive electrode layer, the electrolyte layer and the negative electrode layer, and the collector may be any known one. For example, a layer formed by coating one reactive with the sulfide-based solid electrolyte such as Au, Pt, Al, Ti, or Cu with Au or the like may be used.

EXAMPLES

Next, the present invention is described specifically with reference to Examples, but the present invention is not whatsoever restricted by these Examples.

Example 1

A planetary ball mill (trade name: Classic Line P-7, manufactured by Fritsch Japan Co., Ltd.) was set up. 0.661 g of lithium sulfide, 0.914 g of diphosphorus pentasulfide, 0.164 g of bromine, and 0.261 g of iodine were weighed, put into a container (45 cc, made of zirconia) for the planetary ball mill, and further 4 g of dehydrated chlorobenzene (water content: 10 ppm or less) was put thereinto, and the container was completely sealed up. This container was set in the planetary ball mill, and driven for simultaneous mixing, stirring and grinding at a table rotation number of 500 rpm for 40 hours to prepare a sulfide-based solid electrolyte.

20 ml of dehydrated chlorobenzene was added to the slurry product containing the resultant sulfide-based solid electrolyte and the solvent, and collected in a 50-ml Schlenk bottle, and after a powder precipitated, the supernatant solvent was removed. Next, while heated at 100° C. in an oil bath, this was dried under reduced pressure using a vacuum pump to give a powdery sulfide-based solid electrolyte (80 (0.75 $Li_2S$/0.25 $P_2S_5$)/10 LiBr/10 LiI, Li:S:P:Br:I (by mol) =1.400:1.600:0.400:0.100:0.100). The resultant powdery sulfide-based solid electrolyte was analyzed through powdery X-ray diffraction (XRD) using an X-ray diffractometer (XRD) (Smart Lab Apparatus, manufactured by Rigaku Corporation). Any other peak than the peaks derived from the raw materials was not detected. Analyzed using an ICP emission spectrometric apparatus, the composition was Li:S: P:Br:I (by mol)=1.390:1.590:0.400:0.109:0.101.

The resultant powdery amorphous sulfide-based solid electrolyte was heated on a hot plate set in a glove box, at 188° C. for 3 hours to give a crystalline sulfide-based solid electrolyte. Powdery X-ray diffractometry (XRD) of the resultant sulfide-based solid electrolyte gave crystallization peaks at 2θ=19.9°, 23.6°. The ion conductivity of the resultant crystalline sulfide-based solid electrolyte was measured to be $5.74 \times 10^{-3}$ (S/cm), which confirmed such a high ion conductivity. Various conditions in Example 1 and the ion conductivity of the resultant sulfide-based solid electrolyte are shown in Table 1.

The ion conductivity was measured as follows.

The resultant crystalline sulfide-based solid electrolyte was molded to give circular pellets each having a diameter of 10 mm (cross section S: 0.785 cm$^2$) and a height (L) of 0.1 to 0.3 cm to be samples. Electrode terminals were led from top and bottom of each sample to measure the ion conductivity of the sample according to an AC impedance method at 25° C. (frequency range: 5 MHz to 0.5 Hz, amplitude: 10 mV) to draw a Cole-Cole plot. At around the right end of the arc observed in the high-frequency side region, the real number part Z'(Ω) at the point at which −Z"(Ω) is the smallest is referred to as the bulk resistance R(Ω) of the electrolyte, and the ion conductivity σ(S/cm) was calculated according to the following equation.

$R = \rho(L/S)$ $\sigma = 1/\rho$

Example 2

A powdery sulfide-based solid electrolyte (75 (0.75 $Li_2S$/ 0.25 $P_2S_5$)/15 LiBr/10 LiI, Li:S:P:Br:I (by mol)=1.375:

1.500:0.375:0.150:0.100) was produced in the same manner as in Example 1, except that in Example 1, 0.645 g of lithium sulfide, 0.851 g of diphosphorus pentasulfide, 0.245 g of bromine and 0.259 g of iodine were used. The resultant powdery sulfide-based solid electrolyte was analyzed through powdery X-ray diffractometry (XRD) in the same manner as in Example 1, which confirmed absence of any other peak than the peaks derived from the raw materials. Analyzed using an ICP emission spectrometric apparatus, the composition was Li:S:P:Br:I (by mol)=1.358:1.480:0.374:0.166:0.102.

The resultant powdery amorphous sulfide-based solid electrolyte was heated on a hot plate set in a glove box, at 188° C. for 3 hours to give a crystalline sulfide-based solid electrolyte. Powdery X-ray diffractometry (XRD) of the resultant sulfide-based solid electrolyte gave crystallization peaks at 2θ=19.9°, 23.6°. The ion conductivity of the resultant crystalline sulfide-based solid electrolyte was measured according to the above (measurement of ion conductivity) to be $6.09 \times 10^{-3}$ (S/cm), which confirmed such a high ion conductivity. Various conditions in Example 2 and the ion conductivity of the resultant sulfide-based solid electrolyte are shown in Table 1.

Example 3

A powdery sulfide-based solid electrolyte (75 (0.75 $Li_2S$/0.25 $P_2S_5$)/15 LiBr/10 LiI, Li:S:P:Br:I (by mol)=1.375:1.500:0.375:0.150:0.100) was produced in the same manner as in Example 1, except that in Example 1, 0.550 g of lithium sulfide, 0.887 g of diphosphorus pentasulfide, 0.277 g of lithium bromide and 0.285 g of lithium iodide, in place of bromine and iodine, were used. The resultant powdery sulfide-based solid electrolyte was analyzed through powdery X-ray diffractometry (XRD) in the same manner as in Example 1, which confirmed absence of any other peak than the peaks derived from the raw materials, that is, the powdery sulfide-based solid electrolyte is an amorphous sulfide-based solid electrolyte. Analyzed using an ICP emission spectrometric apparatus, the composition was Li:S:P:Br:I (by mol)=1.366:1.482:0.372:0.159:0.103.

The resultant powdery amorphous sulfide-based solid electrolyte was heated on a hot plate set in a glove box, at 210° C. for 3 hours to give a crystalline sulfide-based solid electrolyte. Powdery X-ray diffractometry (XRD) of the resultant sulfide-based solid electrolyte gave crystallization peaks at 2θ=19.9°, 23.6°. The ion conductivity of the resultant crystalline sulfide-based solid electrolyte was measured according to the above (measurement of ion conductivity) to be $5.44 \times 10^{-3}$ (S/cm), which confirmed such a high ion conductivity. Various conditions in Example 3 and the ion conductivity of the resultant sulfide-based solid electrolyte are shown in Table 1.

Comparative Example 1

A sulfide-based solid electrolyte was produced in the same manner as in Example 1, except that, in Example 1, dehydrated toluene (water content: 10 ppm or less) was used in place of dehydrated chlorobenzene. 5 ml of dehydrated toluene was added to the slurry product containing the resultant sulfide-based solid electrolyte and the solvent, in a glove box, and collected in a metal vat, and after a powder (solid electrolyte) precipitated, the supernatant solvent was removed. Next, the precipitated powder was put on a hot plate and dried at 80° C. to give a powdery sulfide-based solid electrolyte (80 (0.75 $Li_2S$/0.25 $P_2S_5$)/10 LiBr/10 LiI, Li:S:P:Br:I (by mol)=1.400:1.600:0.400:0.100:0.100). The resultant powdery sulfide-based solid electrolyte was analyzed through powdery X-ray diffraction (XRD) in the same manner as in Example 1, which confirmed absence of any other peak than the peaks derived from the raw materials, that is, the powdery sulfide-based solid electrolyte is an amorphous sulfide-based solid electrolyte. Analyzed using an ICP emission spectrometric apparatus, the composition was Li:S:P:Br:I (by mol)=1.391:1.603:0.404:0.100:0.105.

The resultant powdery amorphous sulfide-based solid electrolyte was heated at 203° C. for 3 hours to give a crystalline sulfide-based solid electrolyte. Powdery X-ray diffractometry (XRD) of the resultant sulfide-based solid electrolyte gave crystallization peaks at 2θ=19.9°, 23.6°. The ion conductivity of the resultant crystalline sulfide-based solid electrolyte was measured to be $5.20 \times 10^{-3}$ (S/cm), which confirmed that the ion conductivity thereof was not so high like that of the ion conductivity of the crystalline sulfide-based solid electrolyte of Example 1. Various conditions in Comparative Example 1 and the ion conductivity of the resultant sulfide-based solid electrolyte are shown in Table 1.

Comparative Example 2

A sulfide-based solid electrolyte was produced in the same manner as in Example 2, except that, in Example 2, dehydrated toluene (water content: 10 ppm or less) was used in place of dehydrated chlorobenzene. 5 ml of dehydrated toluene was added to the slurry product containing the resultant sulfide-based solid electrolyte and the solvent, in a glove box, and collected in a metal vat, and after a powder (solid electrolyte) precipitated, the supernatant solvent was removed. Next, the precipitated powder was put on a hot plate and dried at 80° C. to give a powdery sulfide-based solid electrolyte (75 (0.75 $Li_2S$/0.25 $P_2S_5$)/15 LiBr/10 LiI, Li:S:P:Br:I (by mol)=1.375:1.500:0.375:0.150:0.100). The resultant powdery sulfide-based solid electrolyte was analyzed through powdery X-ray diffraction (XRD) in the same manner as in Example 1, which confirmed absence of any other peak than the peaks derived from the raw materials, that is, the powdery sulfide-based solid electrolyte is an amorphous sulfide-based solid electrolyte. Analyzed using an ICP emission spectrometric apparatus, the composition was Li:S:P:Br:I (by mol)=1.358:1.503:0.382:0.157:0.105.

The resultant powdery amorphous sulfide-based solid electrolyte was heated at 188° C. for 3 hours to give a crystalline sulfide-based solid electrolyte. Powdery X-ray diffractometry (XRD) of the resultant sulfide-based solid electrolyte gave crystallization peaks at 2θ=19.9°, 23.6°. The ion conductivity of the resultant crystalline sulfide-based solid electrolyte was measured to be $5.41 \times 10^{-3}$ (S/cm), which confirmed that the ion conductivity thereof was not so high like that of the ion conductivity of the crystalline sulfide-based solid electrolyte of Example 2. Various conditions in Comparative Example 2 and the ion conductivity of the resultant sulfide-based solid electrolyte are shown in Table 1.

Comparative Example 3

A sulfide-based solid electrolyte was produced in the same manner as in Example 3, except that, in Example 3, dehydrated toluene (water content: 10 ppm or less) was used in place of dehydrated chlorobenzene. 5 ml of dehydrated toluene was added to the slurry product containing the resultant sulfide-based solid electrolyte and the solvent, in a glove box, and collected in a metal vat, and after a powder (solid electrolyte) precipitated, the supernatant solvent was removed. Next, the precipitated powder was put on a hot plate and dried at 80° C. to give a powdery sulfide-based solid electrolyte (75 (0.75 $Li_2S$/0.25 $P_2S_5$)/15 LiBr/10 LiI, Li:S:P:Br:I by mol)=1.375:1.500:0.375:0.150:0.100). The resultant powdery sulfide-based solid electrolyte was analyzed through powdery X-ray diffraction (XRD) in the same manner as in Example 1, which confirmed absence of any other peak than the peaks derived from the raw materials, that is, the powdery sulfide-based solid electrolyte is an amorphous sulfide-based solid electrolyte. Analyzed using an ICP emission spectrometric apparatus, the composition was Li:S:P:Br:I (by mol)=1.367:1.482:0.372:0.160:0.103.

The resultant powdery amorphous sulfide-based solid electrolyte was heated at 210° C. for 3 hours to give a crystalline sulfide-based solid electrolyte. Powdery X-ray diffractometry (XRD) of the resultant sulfide-based solid electrolyte gave crystallization peaks at 2θ=19.9°, 23.6°. The ion conductivity of the resultant crystalline sulfide-based solid electrolyte was measured to be $5.04 \times 10^{-3}$ (S/cm), which confirmed that the ion conductivity thereof was not so high like that of the ion conductivity of the crystalline sulfide-based solid electrolyte of Example 3. Various conditions in Comparative Example 2 and the ion conductivity of the resultant sulfide-based solid electrolyte are shown in Table 1.

TABLE 1

| | Halogen Source | Grinding Machine | Solvent | Raw Materials Blending Ratio (molar ratio) | Ion Conductivity S/cm |
|---|---|---|---|---|---|
| Example 1 | Substance $X_2$ | ball mill | chlorobenzene | 70.0:20.0:5.0:5.0 ($Li_2S:P_2S_5:Br_2:I_2$) | $5.74 \times 10^{-3}$ |
| Comparative Example 1 | Substance $X_2$ | ball mill | toluene | 70.0:20.0:5.0:5.0 ($Li_2S:P_2S_5:Br_2:I_2$) | $5.20 \times 10^{-3}$ |
| Example 2 | Substance $X_2$ | ball mill | chlorobenzene | 68.75:18.75:7.5:5.0 ($Li_2S:P_2S_5:Br_2:I_2$) | $6.09 \times 10^{-3}$ |
| Comparative Example 2 | Substance $X_2$ | ball mill | toluene | 68.75:18.75:7.5:5.0 ($Li_2S:P_2S_5:Br_2:I_2$) | $5.41 \times 10^{-3}$ |
| Example 3 | Li Halide | ball mill | chlorobenzene | 56.25:18.75:15.0:10.0 ($Li_2S:P_2S_5:LiBr:LiI$) | $5.44 \times 10^{-3}$ |
| Comparative Example 3 | Li Halide | ball mill | toluene | 56.25:18.75:15.0:10.0 ($Li_2S:P_2S_5:LiBr:LiI$) | $5.04 \times 10^{-3}$ |

The results in Examples 1 to 3 confirm that the sulfide-based solid electrolytes obtained according to the production method of the present embodiment have a high ion conductivity. On the other hand, it is confirmed that the sulfide-based solid electrolytes obtained in Comparative Examples 1 to 3 using an organic solvent not having an electron-withdrawing group (toluene) as a solvent have a low ion conductivity as compared with those of Examples 1 to 3. From these results, it is known that, when an organic solvent having an electron-withdrawing group, especially chlorobenzene is used in place of an ordinary solvent, toluene in producing a sulfide-based solid electrolyte, the ion conductivity of the resultant solid electrolyte increases. Comparing Examples 2 and 3 in point of the absolute value of an ion conductivity, it is confirmed that using a substance X2 (halogen simple substance) as a halogen source realizes a higher ion conductivity than using a lithium halide.

INDUSTRIAL APPLICABILITY

According to the production method of the present embodiment, a sulfide-based solid electrolyte having a high ion conductivity and excellent in battery performance can be produced. The sulfide-based solid electrolyte produced according to the production method of the present embodiment is favorably used for batteries, especially for batteries used in information-related equipments and communication instruments such as personal computers, video cameras, and mobile phones.

The invention claimed is:

1. A method for producing a sulfide-based solid electrolyte containing an alkali metal, a sulfur element, a phosphorus element and a halogen element, comprising performing a reaction of an alkali metal sulfide and a substance containing at least one element of a sulfur element, a phosphorus element and a halogen element in an organic solvent having an electron-withdrawing group and a benzene ring, and wherein the electron-withdrawing group is at least one selected from the group comprising a halogen element-containing group, a nitrogen element-containing group, and an oxygen element-containing group.

2. The method for producing a sulfide-based solid electrolyte according to claim 1, wherein the substance contains an alkali metal halide.

3. The method for producing a sulfide-based solid electrolyte according to claim 2, wherein the reaction is a reaction of an alkali metal sulfide, and a phosphorus compound and an alkali metal halide.

4. The method for producing a sulfide-based solid electrolyte according to claim 2, wherein the alkali metal halide is at least one selected from lithium bromide and lithium iodide.

5. The method for producing a sulfide-based solid electrolyte according to claim 3, wherein the phosphorus compound is phosphorus sulfide.

6. A method for producing a sulfide-based solid electrolyte containing an alkali metal, a sulfur element, a phosphorus element and a halogen element, comprising performing a reaction of an alkali metal sulfide and a substance containing at least one element of a sulfur element, a phosphorus element and a halogen element in an organic solvent having an electron-withdrawing group, and wherein the substance contains a substance represented by a formula (1):

$$X_2 \qquad (1)$$

wherein X represents a halogen element.

7. The method for producing a sulfide-based solid electrolyte according to claim 6, wherein the substance represented by the formula (1) is at least one selected from iodine and bromine.

8. The method for producing a sulfide-based solid electrolyte according to claim 6, wherein the reaction is a reaction of an alkali metal sulfide, and a phosphorus compound and the substance represented by the formula (1).

9. The method for producing a sulfide-based solid electrolyte according to claim 8, wherein the phosphorus compound is phosphorus sulfide.

10. The method for producing a sulfide-based solid electrolyte according to claim 1, wherein the alkali metal sulfide is at least one selected from lithium sulfide and sodium sulfide.

11. The method for producing a sulfide-based solid electrolyte according to claim 1, wherein the organic solvent having an electron-withdrawing group is at least one selected from a fluorine element-containing organic solvent, a chlorine element-containing organic solvent, a bromine element-containing organic solvent, a nitrogen element-containing organic solvent and an oxygen element-containing organic solvent.

12. The method for producing a sulfide-based solid electrolyte according to claim 1, wherein the organic solvent having an electron-withdrawing group is at least one selected from chlorobenzene, trifluoromethylbenzene and nitrobenzene.

13. The method for producing a sulfide-based solid electrolyte according to claim 12, wherein the organic solvent having an electron-withdrawing group is chlorobenzene.

\* \* \* \* \*